May 9, 1950

E. D. LILJA 2,506,798

STABILIZED POWER ACTUATOR AND
METHOD OF OPERATING SAME

Filed Aug. 6, 1943

INVENTOR
Edgar D. Lilja
BY
Parker, Carlson, Pitzner & Hubbard
ATTORNEYS

May 9, 1950 E. D. LILJA 2,506,798
STABILIZED POWER ACTUATOR AND
METHOD OF OPERATING SAME
Filed Aug. 6, 1943 3 Sheets-Sheet 2

INVENTOR
Edgar D. Lilja
BY
Parker, Carlson, Pitzner Hubbard
ATTORNEYS

May 9, 1950

E. D. LILJA 2,506,798

STABILIZED POWER ACTUATOR AND
METHOD OF OPERATING SAME

Filed Aug. 6, 1943

INVENTOR
Edgar D. Lilja
BY
Parker, Carlson, Pitzner + Hubbard
ATTORNEYS

Patented May 9, 1950

2,506,798

UNITED STATES PATENT OFFICE 2,506,798

STABILIZED POWER ACTUATOR AND METHOD OF OPERATING SAME

Edgar D. Lilja, Rockford, Ill., assignor to Barber-Colman Company, Rockford, Ill., a corporation of Illinois Application August 6, 1943, Serial No. 497,669

16 Claims. (Cl. 74—388)

1

The present invention pertains to power actuators or servos and method of operating the same. The general aim of the present invention is to provide a novel method and apparatus for effecting stabilization or anti-hunting action in such a device, and as a consequence of which a servo is able to follow with a high degree of accuracy the positional changes of a controlling element.

More particularly, it is an object of the present invention to provide a stabilizer arrangement for such an actuator or servo which operates through the use of automatic compensation for the effects of change in rate of movement of the servo in bringing the same accurately into a desired position.

Another object is to provide a servo in which the driven member is not only disconnected from its driver in bringing it to rest to free the member from the inertia effect of the driver, but in which such disconnection is effected at a "control point" which is varied automatically substantially in accordance with the rate and magnitude of change in speed of the driven member during its motion.

Still another object is to provide an arrangement affording a two-component potential for effecting the application of driving power to a driven member, one component persisting so long as the driven member is displaced from a predetermined point, and the other component, which is algebraically added to the first, being preponderately a function of the rate and magnitude of change in speed of the driven member.

A further object is to provide a servo or power actuator in which the application of power by the servo is proportioned in accordance with its displacement relative to a control member but with such applied power modified substantially in accord with changes in rate and magnitude of movement of the servo.

Still a further object is to provide a servo in which a change in speed is accompanied by a modification in an opposite sense of the applied power.

The invention also resides in certain novel features of the vacuum tube arrangement employed.

Further objects and advantages of the invention will become apparent as the following description proceeds, taken in connection with the accompanying drawings in which.

2

Figure 3:
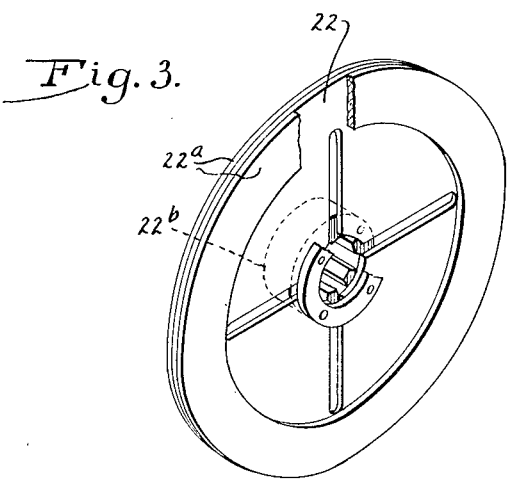

Fig. 3 is a perspective view of one of the clutch elements.

Figure 1:
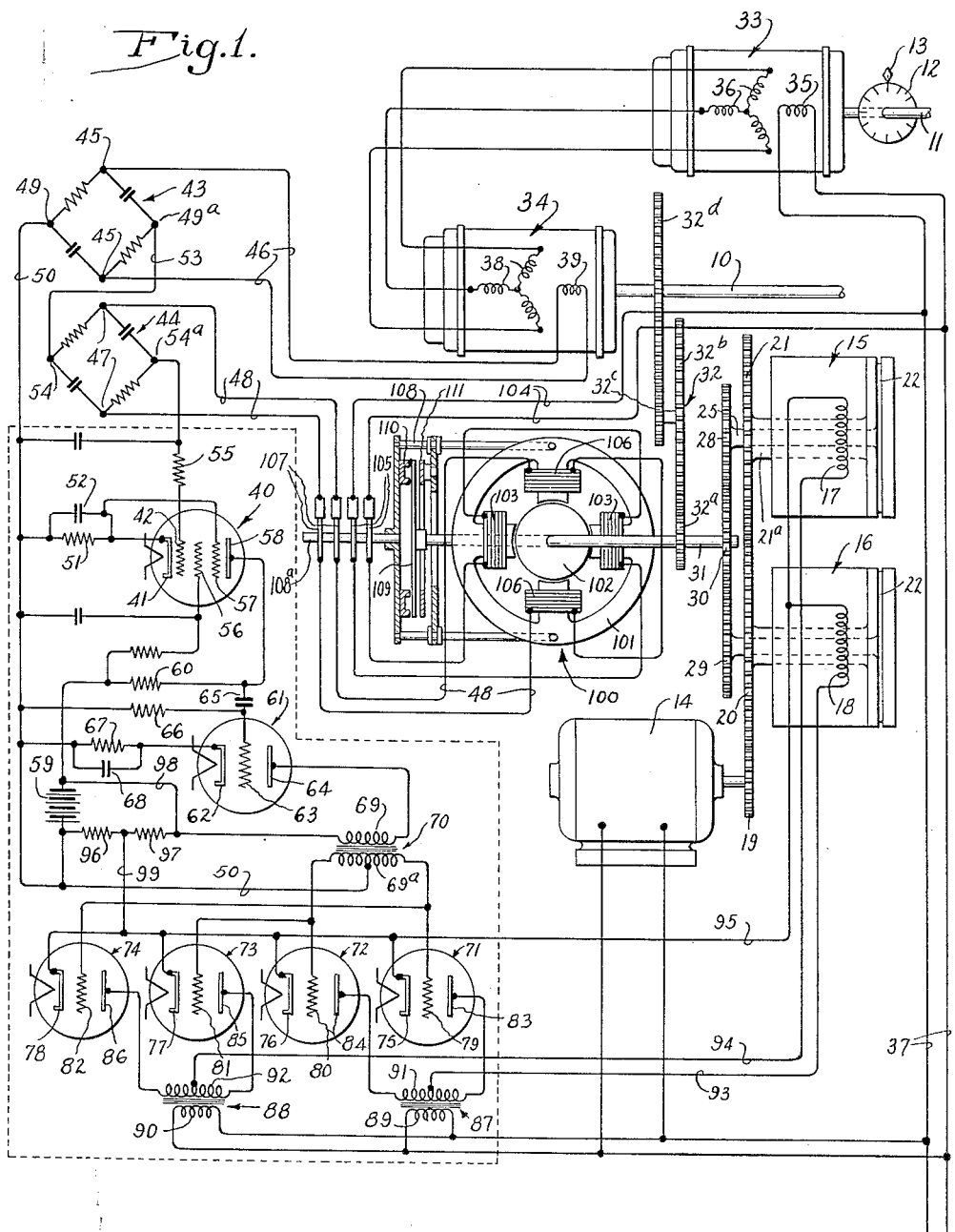
Figure 1 is a schematic view of a servo system provided with the improved power actuator and its control.
Figure 4:
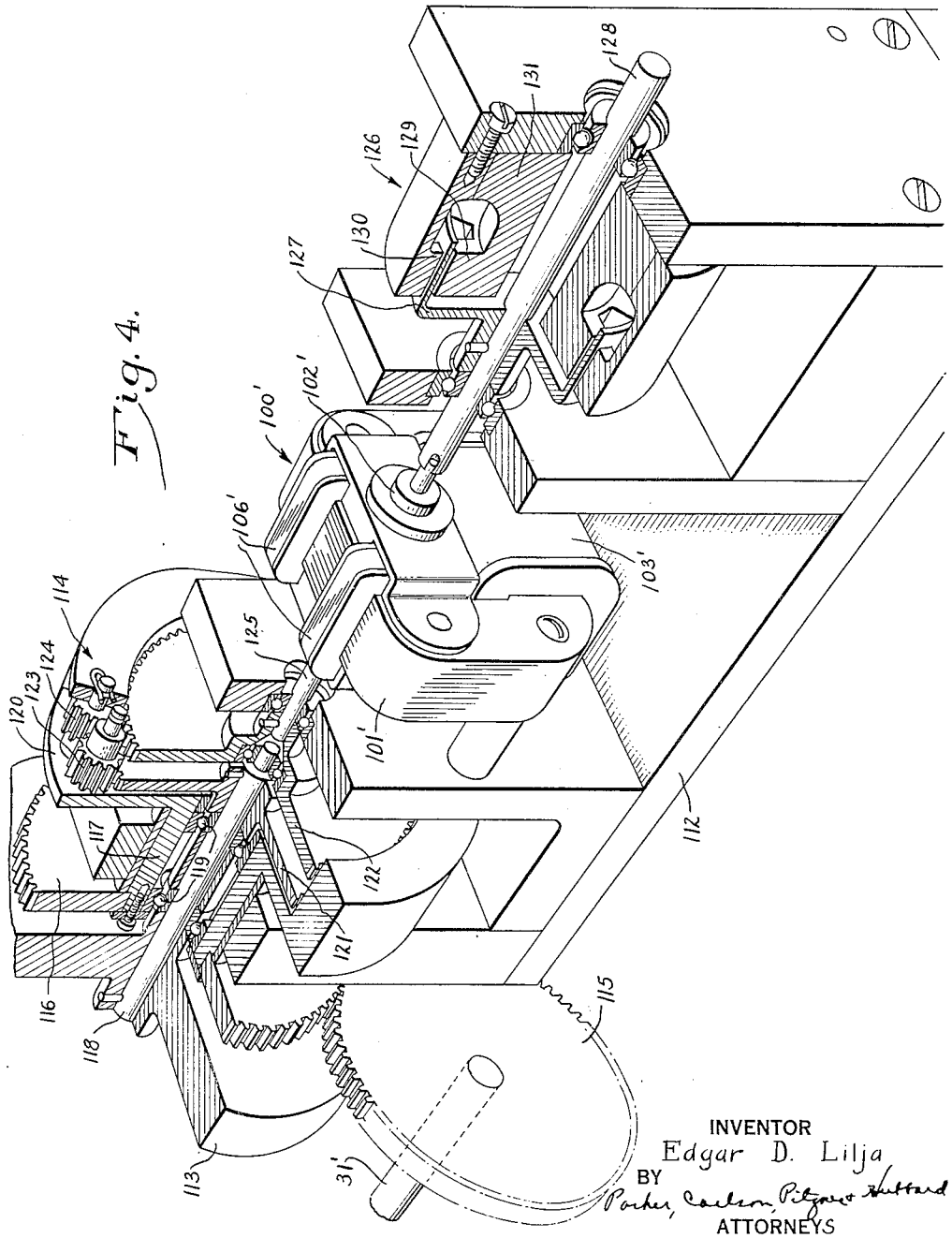

Fig. 4 is a fragmentary perspective view of a modified form of stabilizer unit adapted for use in the servo system of Fig. 1 in lieu of the stabilizer shown in the latter.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more particularly to the accompanying drawings, the invention has been shown in Fig. 1 as embodied in a servo or follow-up system in which a rotatable driven shaft 10 constitutes the driven member of a servo adapted for connection to any desired element (not shown) which is to be actuated. The shaft 10 is arranged in the illustrated servo system to follow rotatively the motion of a rotary "control shaft" 11. Of course the control shaft 11 may be turned by hand, the power, or in accordance with changes in any desired condition, whether mechanical, chemical or electrical. The point is that the control shaft 11 is shown as simply representative of any variable element whose successive conditions are to be reproduced in rotary motion by the driven member 10. In the schematic showing of Fig. 1, a dial and pointer 12, 13 indicate the angular positions of the control shaft 11.

Figure 2:
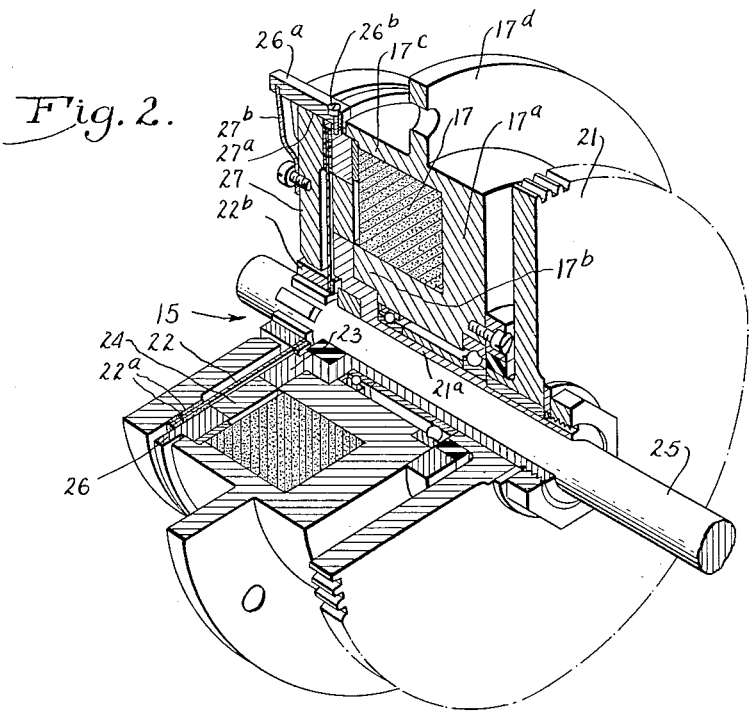
Fig. 2 is a fragmentary perspective view of one of the clutches included in the system of Fig. 1.

The illustrated servo comprises an electric motor 14 as a source of power for turning the driven shaft 10 upon connection thereto by alternately engageable friction clutches 15, 16 for respectively counterclockwise and clockwise rotation of the shaft 10 (directions of rotation are designated with reference to a view of the shaft from its righthand end). The power transmitted from the motor 14 is governed by the degree of engagement or, to put it another way, by the amount of slip, in the selected one of the clutches 15, 16. These clutches have been shown as electromagnetically actuated and the amount of torque transmitted thereby is substantially proportional to the energization of their actuating windings throughout their normal working range. It should be noted in passing that the principal purpose of utilizing a unidirectional motor with variably energizable friction clutches, rather than a variable speed reversing motor is to isolate the motor rotor mechanically from the driven shaft and its connected parts so that the inertia of the motor rotor will not aggravate the problem of stabilization. The clutches 15, 16 may take various forms, their construction per se forming no part of the present invention. The two are duplicates and suitable exemplary construction for the clutch 15 has been shown in Figs. 2 and 3. The driven element of the clutch comprises a thin disk 22 and covered in this instance by a thin ring 22a of cork or other friction material. Radial slotting of the disk 22 minimizes warping. Hub 22b of the disk 22 is splined on a shaft 25 that carries a gear 28 (see Fig. 1) included in the drive connection to the driven shaft 10, as hereinafter detailed. The shaft 25 is journaled intermediate its ends in a sleeve 21a which carries a gear 21 driven from motor pinion 19 through a corresponding gear 20 of the other clutch 16. The sleeve 21a carries the driving elements of the clutch, arranged on opposite sides of the driven disk 22. Such driving elements comprise a flange 23, a connected ring 24 of non-magnetic material, and an outer connected ring 26. Keys 26a secured to the ring 26 by screws 26b project across the outer end of the disk into notches 27a on the periphery of a plate 27 which is loose on the hub 22b and is thus driven from the ring 26. Leaf springs 27b carried by the plate 27 act on the keys 26a to urge the plate 27 toward the ring 26 and thus maintain light mechanical contact at all times between opposite friction faces of the disk 22 and the ring and plate.

The rotating flange 23, the ring 26 and the plate 27 form part of a magnetic circuit through the plate 27, which circuit is energized by a stationary electromagnet having a core 17a on which the energizing winding 17 is disposed between inner and outer poles 17b and 17c with their faces located closely adjacent the flange 23 and the ring 26. The magnet core 17a is provided with a mounting flange 17d for stationary support of the same and the sleeve 21a is journaled within such magnet core by suitable anti-friction bearings as shown. Energization of the winding 17 tends to effect engagement of the mating clutch elements, the amount of torque transmitted between the latter being a function of the energization of the winding. As the energizing current for the winding 17 is increased the torque supplied by driven shaft 25 increases and vice versa.

Gears 28, 29 on the driven shafts of the clutches 15, 16 mesh with a gear 30, common to the two, and accordingly the direction of rotation of the shaft 31 for this gear 30 is dependent upon which of the two clutches is engaged. From the shaft 31 to the shaft 10 the drive is by way of a suitable gear train 32. The latter includes a pinion 32a on the shaft 31 meshing with the gear 32b of a gear and pinion cluster 32b, 32c, the pinion 32c of the latter meshing with a gear 32d fast on the shaft 10.

The novel stabilizing arrangement herein contemplated has been illustrated as embodied in the servo whose general construction has been outlined above. Before describing the novel stabilizer arrangement, however, a brief identification will be made of other elements of the particular servo system in which the invention is exemplified. As to such system, the angular positions of the shafts 10 and 11 are compared through the use of a transmitter synchro 33 and a transformer synchro 34. These devices each have a stator and a rotor, the rotors being connected respectively to the shafts 11 and 10. Such synchros, sometimes known respectively as synchronous transmitters or synchronous transformers, are well-known commercial products and operate in a manner well understood for such devices, so that detailing here is unnecessary. In brief, the transmitter synchro 33 is provided with a primary winding 35 on its rotor and an inductively coupled three-phase secondary winding 36 on its stator. The primary winding 35 is excited from an alternating current supply line 37. The terminals of the stator winding 36 of the transmitter 33 are connected to the corresponding terminals of three-phase stator windings 38 of the transformer synchro 34. The latter windings are inductively coupled with a single phase winding 39 on its rotor.

When the synchros are connected in the manner set forth above a voltage is induced in the winding 39 of the transformer synchro which is a sinusoidal function of the discrepancy between the angular positions of the synchro rotors, or, in other words, the shafts 10 and 11. When the two shafts occupy the same angular position, the induced voltage in the winding 39 is zero, but when the position of the shaft 10 lags or leads the position of the shaft 11, a voltage is induced in the winding 39 and the phase of this induced voltage reverses with respect to that of the line 37 when the direction of such discrepancy is changed. In general, then, a potential is produced in the winding 39 which persists throughout any discrepancy in position between the shafts 10 and 11, which is proportional in magnitude to such discrepancy, and which is of a sense corresponding to the sense of such discrepancy. By the term "sense" of a potential, as used herein, is meant the direction of a direct current or, correspondingly, the phase of an alternating current with respect to some reference phase such as that of the alternating supply for the system. In the present instance it happens that alternating current is employed.

The potential induced in the winding 39 of the transformer synchro 34 is, together with a second potential provided for stabilizing purposes in a manner hereinafter described, applied to the input circuit of the first stage amplifier tube 40 of a multi-stage amplifier and electronic control network. The output stage of this network is utilized in effecting selective energization of the clutches 15, 16 as hereinafter detailed. In considering the network, it will be observed that in the input of the first stage tube 40, i. e., between its cathode 41 and control grid 42, two bridges 43 and 44 are connected in series. These bridges each constitute a phase shifting means of well-known form comprising resistances and capacitances connected in opposite legs of each bridge. Input terminals 45 of the bridge 43 are supplied through conductors 46 with the potential induced in the transformer synchro's winding 39, while the input terminals 47 of the other bridge 44 have a second potential impressed thereon through conductors 48 for stabilizing purposes, as hereinafter set forth. To connect the outputs of the bridges 43, 44 in series in the input circuit of the tube 40, one output terminal 49 of the bridge 43 is connected to the cathode 41 through a conductor 50 and resistor 51 shunted by a condenser 52, while the other output terminal 49a of this bridge is connected by conductor 53 to output terminal 54 of the other bridge 44. The other output terminal 54a of the latter bridge is connected to the grid 42 through a resistor 55.

The amplifier network may, of course, take a variety of forms. In the particular layout shown the first stage tube 40 is a pentode, having, in addition to the elements already noted, a screen grid 56, a suppressor 57 and an anode 58. In the output circuit of this tube 40 plate voltage is supplied from a battery 59, which is connected between the cathode and anode in series with a load resistor 60 and biasing resistor 51 shunted by condenser 52.

The second stage of the amplifier comprises a triode 61 having a cathode 62, a control grid 63 and an anode 64. The control grid 63 is coupled to the output of the first stage tube 40 through a condenser 65 and the input circuit of the tube 61 is completed from the grid 63 to the cathode 62 through resistors 66 and 67, the latter being shunted by a condenser 68. The primary winding 69 of a coupling transformer 70 is connected in the output circuit of the tube 61, plate voltage being also supplied for this tube from the battery 59.

The final or output stage of the network comprises four tubes 71, 72, 73 and 74. The tubes 71, 72 are arranged to control the clutch 16, while the other two tubes 73, 74 are arranged to control the clutch 15. Each of these tubes is shown as a triode, having respective cathodes 75, 76, 77, 78, respective grids 79, 80, 81, 82, and respective anodes 83, 84, 85, 86. On the input sides of the tubes 71 to 74 their grids are connected to a secondary winding 69a of the coupling transformer 70. Thus, the grids of tubes 71 and 74 are connected to one end terminal of this winding, while the grids of tubes 72 and 73 are connected to the other end terminal of this winding, its center terminal being connected to the common line 50. On the output sides of the tubes 71 to 74 plate voltage is supplied from two power transformers 87 and 88 having respective primary windings 89 and 90 excited from the alternating current supply lines 37. These transformers are provided with secondary windings 91 and 92 respectively, having center taps connected to corresponding ones of the clutch exciting windings 18 and 17 through conductors 93 and 94. Such exciting windings have a common return line 95 to the cathodes of the four tubes 71 to 74. The end terminals of the transformer secondary winding 91 are connected to the respective anodes of tubes 71 and 72, while the end terminals of the other transformer secondary winding 92 are connected to the anodes of the other two tubes 73 and 74.

Of the four tubes 71 to 74, only one is conductive at any one time. The one of these tubes which is at any given instant conductive is that one whose grid is connected to what is at that instant the positive side of the transformer secondary winding 69a and whose plate is at that instant energized positively from the corresponding one of the transformers 87, 88. By way of illustration, it may be assumed that at a given instant the righthand terminals of each of the three transformer secondaries 69a, 91 and 92 are positive and the lefthand terminals negative. In such case only the tube 71 has the necessary combination of positive plate potential and relatively positive grid potential to render the tube conductive, wherefore current flows through its plate circuit energizing the winding 18 of the clutch 16. On the next half cycle all of the polarities will be reversed and the companion tube 72 will conduct, again energizing the winding 18 of clutch 16. If, however, the phase of the voltage across the transformer secondary winding 69a is reversed, as is the case when there is a discrepancy in angular position between the shafts 10 and 11 in a sense opposite to that prevailing for the conditions assumed above, the other two tubes 73 and 74 will conduct during alternate half cycles, thereby energizing the winding 17 of the clutch 15. It is to be observed that the grids of the tubes 71 to 74 are not permitted to become positive with respect to their corresponding cathodes by virtue of the negative biasing applied to such grids with respect to their cathodes. The negative bias is effected by means of a voltage divider comprising resistors 96, 97 connected across the battery 59 by a conductor 98 and having a mid tap connected by a conductor 99 to the common line 95 of the cathodes.

From the foregoing it will be seen that since the conduction of the tubes 71 to 74 is dependent on the phase relation of the voltages on their input and output circuits, it is requisite that the phase of the voltage induced in the transformer secondary winding 69a agree closely with that of the voltage in the lines 37. It is in order to facilitate the adjustment of this phase relation that the phase changing bridges 43 and 44 are provided. Through adjustment of the same in their well-known manner, the required phase relation of the voltages noted may be readily obtained in setting up the system.

As so far described, the circuit is such that any discrepancy in position between the driven shaft 10 and transmitter shaft 11 causes the appropriate one of the clutches 15, 16 to be engaged for turning the shaft 10 in a direction to restore it to coincidence in angular position with the control shaft 11, such energization of the proper clutch persisting until the shaft 10 has turned to the position predetermined by the location of the shaft 11. In the absence of other provision, however, this operation would be accompanied by considerable hunting with consequent loss in accuracy of the positioning of the shaft 10 relative to the control shaft 11. In accordance with the present invention the arrangement next to be described has been provided for stabilizing the action of the system in order to obviate such hunting and enhance the accuracy of the control.

In brief, stabilization is effected by terminating the energizing voltage of the engaged one of the clutches 15, 16 at a point automatically determined as a direct function of the relative velocity between the rotor 102 and stator 101. Such point of termination of the voltage applied to the engaged one of the clutches, or, in other words, termination of the application of driving power to the driven member, may be conveniently designated as the "control point," and the presently disclosed stabilizer is adapted to effect a shift of that control point. During acceleration of the driven member, the control point is reached earlier by reason of the stabilizer action, and during deceleration the control point is postponed. Expressed in terms of rotation, when the shaft 10 is rotating clockwise and is accelerating, the control point is shifted counterclockwise and is reached sooner than otherwise. On the other hand, if the shaft 10 is running clockwise and is decelerating, the control point is advanced in a clockwise direction and is reached later by reason of such shift.

In the present instance such shift in the control point is effected by adding algebraically to the input potential of the amplifier network previously described and derived from the phase shifter bridge 43, a second component of potential which is impressed on the circuit by way of the other phase shifter bridge 44. This second potential is of a sense opposite to such rate of change; that is, if the shaft 10 is accelerating, the potential supplied from bridge 44 is opposite in sense to the potential from bridge 43, while if the shaft 10 is decelerating the potential from bridge 44 is of the same sense as that from the bridge 43. To put it another way, when the transmitter and shaft are accelerating the potentials are opposed and when the shaft is decelerating they are additive. In both instances the magnitude of the second potential component is a complex function of the rate and magnitude of change of speed of the shaft 10. The net result, achieved in the exemplary system by such algebraic addition of the two potential components noted, is to provide an energizing potential for the clutches 15, 16 which is terminated at a point varied automatically in accordance with the magnitude and time duration of acceleration or deceleration of the shaft 10.

The additional or second potential, noted above as being provided for stabilizing purposes, is in the illustrated apparatus supplied from an induction generator 100 having a shell type stator 101 and a squirrel cage rotor 102, the latter being fixed to the shaft 31. On the four pole pieces of the stator 101 is a diametrically opposed pair of windings 103 energized from the alternating current supply lines 37 through conductors 104 and slip rings 105, as well as a second diametrically opposed pair of windings 106 connected to the bridge 44 through conductors 48 and slip rings 107. When the rotor 102 turns in relation to the stator 101 a voltage is induced in the windings 106 which is proportional to the speed of the rotor relative to the stator. Stated in other words, the voltage induced in the windings 106 is proportional to the discrepancy in speed between the driven shaft 31 and the stator 101. Such proportionality of output voltage to speed is characteristic of induction generators.

In the stabilizer setup illustrated in Fig. 1, both the rotor and stator of the generator 100 are revoluble, one being turned at a speed varying precisely what that of the shaft 10 and the other being driven by a magnetic drag coupling between 110 and 109 tends to turn at the same speed as the shaft 102. Accordingly, the differential, when any exists, in speed between the two generator elements (and which results in an output voltage of proportional magnitude) is a complex function of the rate of changes in speed of the shaft 10. In the present instance the rotor is fixed directly to the shaft 31 so that its speed corresponds exactly to the instantaneous speed of the shaft 10, the actual ratio of the rotor speed to that of shaft 10 being determined by the ratio of the gearing between them. The stator 101 is, on the other hand, as a result of the combined action of the inertia of stator 101 and the slip connection, revolved at a speed which changes relatively less rapidly than that of shaft 10, and will ultimately, for constant speeds of said shaft, rotate at approximately the same speed as the rotor 102. In the apparatus shown in Fig. 1 the stator is itself adapted to act as an inertia member or flywheel in accomplishing its rotation at the desired average speed. The stator, because of its inertia and the fact that it is driven by a slipping connection from the rotor, rotates at a less rapidly varying speed determined by: the stabilizer constants, the speed of the rotor, and the variations in the rotor speed during a short time interval preceding the instant under consideration. During periods of constant acceleration or deceleration of the rotor, there tends, therefore, to be a speed difference between the rotor and stator.

Torque is applied to the generator stator 101 for driving it from the shaft 31 through what may be termed a slip connection in order that the relatively large inertia stator, acting as it does as a flywheel, may revolve at a relatively constant speed but may, nevertheless, turn relative to the rotor 102 on the latter when occasion demands. This coupling is located between the shaft 31 and a stator supporting frame 108, the latter being carried by a shaft 108a revoluble coaxially with the shaft 31. The coupling comprises a disk type of drag device including an electrically conductive, non-magnetic disk 109 made of copper or aluminum and fixed to the shaft 31. This disk is interposed between an annular series of U-shaped permanent magnets 110 and soft iron keeper ring 111, both fixed to the frame 108 coaxially with the shaft 108a. The flux created by the permanent magnets 110 threads from one leg of each through the disk into the keeper 111 and thence back through the disk into the other leg of each such magnet, and in so doing sets up eddy currents in the disk 109, exerting a torque on the disk which is proportional to its speed relative to the permanent magnet. In consequence of this connection, the torque exerted on the stator is directly proportioned to the differential in speed between the stator and rotor.

By way of recapitulation of the operation of the disclosed system described above, it will be noted that a potential is supplied from the synchro winding 39 which is of a sense and of a magnitude proportional to any deviation in position of the shaft 10 with reference to shaft 11. Acting alone, this potential, operating through the vacuum tube network described, causes energization of the appropriate one of the clutches 15, 16 to revolve the shaft 10 into angular coincidence with the shaft 11. Moreover, the degree of energization of the one of the clutches rendered operative is generally proportional to the amount of discrepancy in shaft position. The clutch slippage is thus proportionately decreased as the discrepancy may be increased so that the greater the displacement of the shaft 10 with reference to the control shaft 11, the greater will be the torque exerted. By way of stabilization, however, to avoid hunting and inaccuracy of servo positioning, the action just described, is in accordance with the present invention, modified. Such modification consists of a change in the potential supplied to the amplifier network, in the present instance through the imposition of a second potential component which is preponderately a function of the rate and magnitude of change in speed of the driven shaft 10. Thus, in the event of acceleration of the shaft 10 a potential is produced in the generator windings 106 and is impressed in the amplifier network in voltage opposition to the potential derived from the transformer synchro 34. The latter potential is proportional to the amount of discrepancy in position of the shaft 10 with reference to the control shaft 11, and consequently the point at which the two opposed and proportioned potentials balance out to zero, i. e., the control point at which the application of power to the shaft 10 is interrupted by the opening of the one of the clutches which has been closed, is reached sooner in point of time by an amount which is a function of the acceleration and change in velocity. Conversely, if there is a deceleration of the shaft 10 a potential is again produced in the generator windings 106 of a magnitude which is a function of the rate and magnitude of such change in speed, but in this case is impressed on the amplifier network in voltage addition to the potential derived from the transformer synchro 34. Consequently, the control point is in such case advanced in the direction of rotation of the driven shaft 10.

Not only is the control point shifted as described but, in addition, a corresponding change is worked in the speed of the shaft 10 in approaching its zero discrepancy position. In particular, during acceleration of the shaft 10 the power transmitted to it is diminished by the increase in clutch slippage resulting from the decrease in applied current occasioned by the control potential derived from the generator 100. Conversely, during deceleration of the shaft 10, the power transmitted to the shaft 10 is increased, through decrease in clutch slippage brought about by the increase in applied current occasioned by the control potential from the generator 100.

In Fig. 4 is shown a modified form of stabilizer adapted for incorporation in the system of Fig. 1. In Fig. 4 the shaft 31' corresponds to the shaft 31 of Fig. 1 and the generator 100' corresponds to the generator 100, serving as the latter did to produce the desired potential for stabilizing purposes. In the unit of Fig. 4 the establishment of generator connections is simplified, that is, the necessity for slip rings or the like is eliminated, by utilizing an arrangement in which the generator stator 101' is stationary, being mounted on a frame 112. To accommodate such revision, the flywheel function performed in Fig. 1 by the revoluble stator is effected in this case by a separate inertia member or flywheel 113. The desired differential in speed between the speed of this inertia member and the instantaneous speed of the shaft 31' is imparted to the generator rotor 102' through the use of a differential gearing designated generally as 114. Basically the setup is the same as that of Fig. 1 in that the arrangement is such as to cause the generator 100' to produce a control potential which is substantially proportional in magnitude to a function of both the acceleration and magnitude of change in speed of the load and of a sense, relative to the potential produced by the associated synchros, which, for simultaneous movement of said synchros in the same direction, is inverse to the sense of the rate of change in speed of the servo. The control potential so produced may be applied in the general system in the same manner as illustrated in Fig. 1 and the overall operation of the system is the same.

Turning now to the details of the stabilizer shown in Fig. 4, the shaft 31' carries a gear 115 meshing with a gear 116. The latter is fixed to a sleeve 117 coaxial with a shaft 118, but journaled for free rotation relative to the latter on antifriction bearings 119. Also rigid with the sleeve 117 is the intermediate 120 of the differential gearing 114.

The differential gearing 114 comprises, in addition to the intermediate 120, first and second terminal elements or gears 121, 122 arranged side-by-side coaxially with the shaft 118, as well as planet pinions 123, 124 journaled on the intermediate 120 for bodily rotation therewith and meshing respectively with the first and second terminal gears, as well as with each other. The first terminal gear 121 is connected to the flywheel 113, both of these elements being pinned to the shaft 118. The other terminal gear 122 is, on the other hand, pinned to the shaft 125 of the generator rotor 102.

The generator 100' operates as an induction generator and is shown as being constructed in a form ordinarily employed for shaded pole motors. Thus its stator 101' is of the core type and has on it a main energizing winding 103', energized from a main alternating current supply line, as well as auxiliary windings 106' linked by the flux passing between the stator and the squirrel cage rotor 102'. Upon turning of the rotor 102' a potential is thus induced in the windings 106' which is proportional in magnitude to the speed of the rotor relative to the stator and of a sense dependent upon the direction of rotation.

A magnetic drag device designated generally as 126 is applied to the generator rotor 102'. In this instance the drag device consists of a cup 127 made of non-magnetic electrically conductive material, such as copper or aluminum, pinned to a shaft 128 which is in turn rigidly connected to the rotor shaft 125. The cup 127 is received between the opposed annularly disposed pairs of pole pieces 129, 130 of a stationary permanent magnet 131. As a consequence of the eddy currents set up in the cup 127 by the flux from the permanent magnet, a torque is exerted on the generator rotor 102' which is proportional to the speed of rotation of the same. Since the restraint offered by this magnetic drag device is zero at zero speed by the motor, and very small at low speeds, it is sometimes necessary to supplement it by a small friction drag (not shown) applied to the shaft 128 to prevent the generator rotor 102' from rotating during constant speed conditions for the servo.

In considering the operation of the apparatus shown in Fig. 4, it may first of all be assumed that the shaft 31' is revolving at constant speed. In such case the intermediate 120 of the differential gearing 114 is also revolved at constant speed, as is the first terminal gear 121 and the flywheel 113. The second terminal gear 122, as well as the connected generator rotor 102', remains stationary, wherefore no potential is produced in the generator 100'. In the event that the shaft 31' accelerates or decelerates, however, from such constant speed, the speed of the intermediate 120 changes. The flywheel 113, acting on the first terminal gear 121, resists a corresponding change in speed of the latter, wherefore the second terminal gear 122 is forced to turn, thus revolving the generator rotor 102'. It is clear that the generator rotor will tend to revolve in one direction for acceleration of the shaft 31' and in the opposite direction for deceleration and that, moreover, the speed of the generator rotor will be preponderately a function of the rate of acceleration or deceleration and amount of change in speed of the shaft 31'. Accordingly, a control potential of the desired magnitude and sense is provided for modifying the control potential derived from the synchros of Fig. 1 in the manner heretofore described for stabilization purposes.

I claim as my invention:

1. The combination with a rotary driven member and an electrically controlled actuator therefor operable to revolve the driven member at a speed corresponding to the degree of energization of the actuator, of a revoluble inertia member, coupling means tending to revolve the inertia member from said actuator at the speed of said driven member, and means for modifying the energization of said actuator in accordance with departures in the rotative speed of said driven member relative to that of said inertia member.

2. In a stabilizer for a rotary driven member, the combination of a revoluble inertia member, means tending to revolve the inertia member at the speed of the driven member, and means for producing a potential of a sense corresponding to any departure in rotative speed of the driven element relative to that of said inertia member and proportional in magnitude to such departure.

3. The combination with a rotary driven member and an electrically controlled actuator therefor operable to apply to the driven member a torque corresponding to the degree of energization of said actuator, of a revoluble inertia member, a coupling for applying a torque to said inertia member substantially proportional to the relative speed of rotation between the same and said driven member, and means for modifying the energization of said actuator in accordance with departures in the rotative speed of said driven member relative to that of said inertia member.

4. The combination of a rotary driven member, an electrically controlled actuator therefor operable to apply to said member a torque corresponding to the degree of energization of said actuator, means for supplying a first control potential corresponding in sense and magnitude to any discrepancy in position between said driven member and a control member therefor, a revoluble inertia member, coupling means for connecting said inertia member in driven relation with said actuator to revolve at a speed at or approaching that of said driven member, means for supplying a second control potential proportional in magnitude to any departure in the speed of said driven member relative to that of said inertia member and of a sense, relative to that of the first potential, corresponding inversely to the sense of such departure, and means for energizing said actuator in accordance with the algebraic sum of said potentials.

5. The combination of a rotary driven member, an electrically controlled actuator therefor operable to revolve the driven member with a torque corresponding to the degree of energization of said actuator, means for supplying a first potential corresponding in sense and magnitude to any discrepancy in position between said driven member and a control member therefor, an induction generator having independently revoluble rotor and stator elements, means for revolving one of said generator elements in unison with said driven member, means for revolving the other generator element in the same direction as the first at a speed at or approaching that of said driven member, the relative motion between said generator elements occasioned by change in rate of speed of said driven member resulting in the generation of a second potential proportional in magnitude and sense to such change, and means for energizing said actuator in accordance with the algebraic sum of said first and second potentials.

6. The combination of a rotary driven member and an electrically controlled actuator therefor, an induction generator having independently revoluble rotor and stator elements, means for driving said rotor element from said actuator in unison with said driven member, a coupling for transmitting a torque from said actuator to said stator element substantially in proportion to the relative speed of said generator elements, the inertia of said stator tending to cause the same to revolve at a speed more uniform than that of the rotor but which is always approaching the speed of the rotor, and means for utilizing the potential produced by said generator to modify the power applied by said actuator to said driven member.

7. The combination of a rotary driven member, an electrically controlled actuator therefor, a generator having rotor and stator elements, a revoluble inertia member, a differential gear including first and second terminal elements and an intermediate element, means for revolving said intermediate element in unison with said driven member, means connecting said first terminal element to said inertia member and the second terminal element to one of said generator elements, means for applying a torque to said second element resisting the turning thereof substantially proportionately to its speed of movement, any departure of the intermediate element from the corresponding average speed established by said inertia member resulting in a turning of said rotor and consequent production of potential by said generator, and means for utilizing the potential produced by said generator to modify the power applied by said actuator to said driven member.

8. In a servo system the combination comprising a driven member subject to changes in speed; a reversible power means for moving the driven member; and stabilizer means, said stabilizer means including means responsive to the speed of said driven member which prevails immediately prior to a change in speed thereof, means responsive to the speed of said driven member which prevails immediately subsequent to a change in speed thereof, a slip connection including a drag device for drivingly coupling together said speed responsive means, and means actuated conjointly by said speed responsive means for varying the application of power to the driven member.

9. In a servo system the combination comprising a driven member subject to changes in speed; a reversible power means for moving the driven member; and stabilizer means, said stabilizer means including a first rotatable member rotating in accordance with the speed of said driven member which prevails immediately prior to a change in speed thereof, a second rotatable member rotating in accordance with the speed of said driven member which prevails immediately subsequent to a change in speed thereof, means having substantially the speed-torque characteristics of an eddy current drag coupling for gradually reducing the discrepancy in speed between said rotatable members resulting from said speed change, and means energized in response to the discrepancy in speed between said rotatable members for varying the application of power to the driven member.

10. In a servo system the combination comprising a rotary driven member, an electrically controlled actuator therefor, a rotary control member, means for supplying a first control potential corresponding in sense and magnitude to any discrepancy in position between said driven member and said control member, means responsive to the speed of said driven member immediately prior to a change of speed thereof, means responsive to the speed of said driven member immediately subsequent to a change of speed thereof, and means actuated conjointly by said speed responsive means for deriving a stabilizing control potential which is a function of the magnitude of said change of speed, and means for energizing said actuator in accordance with the algebraic sum of said potentials.

11. In a servo system the combination comprising a rotary driven member, an electrically controlled actuator therefor, a rotary control member, means for supplying a first control potential corresponding in sense and magnitude to any discrepancy in position between said driven member and said control member, means responsive to the speed of said driven member immediately prior to a change of speed thereof, means responsive to the speed of said driven member immediately subsequent to a change of speed thereof, and means actuated by said speed responsive means conjointly for deriving a stabilizing control potential which is a function of the magnitude of said change of speed and of a sense opposite to the sense of said change of speed, and means for energizing said actuator in accordance with the algebraic sum of said potentials.

12. The method of effecting stabilized operation of a servo which comprises producing a first potential corresponding in magnitude and sense to the discrepancy in position of the servo relative to the associated control member therefor, driving a rotatable inertia member at a speed which corresponds to the speed of said servo upon constant rotation thereof but which resiliently lags the speed of said servo upon increasing the speed thereof by an amount which is a function of the rate and magnitude of the speed change, generating a second potential of a magnitude proportional to the difference in velocity of said servo and said inertia member and negative in sense with respect to said first potential, algebraically combining said potentials into a resultant potential, and applying power to said servo in accordance with said resultant.

13. In a servo system having a transmitter, the combination comprising a driven member, a drive motor, an electromagnetically engaged clutch interconnecting said driven member and said drive motor and having a torque transmitting characteristic substantially proportional to the electrical energization thereof, means for deriving a first control potential in accordance with the angular displacement of said driven member with reference to said transmitter, means for deriving a second control potential only upon changes in the speed of rotation of the driven member and in an amount which is a function of the difference between the rotative speed of said driven member immediately prior to a change of speed as compared to the speed immediately subsequent to such change, and means for modifying the energization of such clutch in accordance with the algebraic sum of said control potentials.

14. In a servo system the combination comprising a driven member subject to changes in speed; a reversible power means for moving the driven member; and stabilizer means, said stabilizer means including a rotatable member rotating in accordance with the speed of said driven member, a flywheel, an eddy current drag coupling for coupling said rotatable member and said flywheel and for gradually reducing the discrepancy in speed therebetween resulting from said speed change, and means energized in response to the discrepancy in speed between said rotatable member and said flywheel for varying the application of power to the driven member.

15. In a servo system the combination comprising a rotary driven member, an electrically controlled actuator therefor, a rotary control member, means for supplying a first control potential corresponding in sense and magnitude to any discrepancy in position between said driven member and said control member, means responsive to the speed of said driven member immediately prior to a change in speed thereof, means responsive to the speed of said driven member immediately subsequent to a change in speed thereof, and means actuated conjointly by said speed responsive means for deriving a stabilizing control potential which is a function of both the magnitude of said change of speed and the rate at which such change occurs, and means for energizing said actuator in accordance with the algebraic sum of said potentials.

16. In a servo system the combination comprising a rotary driven member, an electrically controlled actuator therefor, a rotary control member, means for supplying a first control potential corresponding in sense and magnitude to any discrepancy in position between said driven member and said control member, means responsive to the speed of said driven member immediately prior to a change in speed thereof means responsive to the speed of said driven member immediately subsequent to a change in speed thereof, and means actuated by said speed responsive means jointly for deriving a stabilizing control potential which is a function of the magnitude and rate of said change of speed and of a sense opposite to the sense of said change of speed, and means for energizing said actuator in accordance with the algebraic sum of said potentials.

EDGAR D. LILJA.

REFERENCES CITED

The following references are of record in the file of this patent:

UNITED STATES PATENTS

| Number | Name | Date |
|---|---|---|
| 2,115,036 | Riggs | Apr. 26, 1938 |
| 2,176,102 | Riggs | Oct. 17, 1939 |
| 2,403,605 | Lesnick | July 9, 1946 |

FOREIGN PATENTS

| Number | Country | Date |
|---|---|---|
| 489,271 | Great Britain | June 20, 1936 |